United States Patent [19]

Horikx et al.

[11] Patent Number: 5,062,920
[45] Date of Patent: Nov. 5, 1991

[54] APPARATUS FOR MAKING A TIGHTLY CLOSED LOOP OF A TAPE OF THERMOPLASTIC MATERIAL AROUND AN OBJECT

[75] Inventors: Cornelis M. Horikx, Brummen; Martinus J. Jaspers, Nuenen, both of Netherlands

[73] Assignee: Akzo NV, Arnhem, Netherlands

[21] Appl. No.: 526,368

[22] Filed: May 21, 1990

[30] Foreign Application Priority Data

May 25, 1989 [NL] Netherlands .......................... 8901314

[51] Int. Cl.⁵ .................. B32B 31/24; B65B 13/00
[52] U.S. Cl. .................. 156/380.4; 156/380.3; 156/380.6; 156/495; 156/580.1; 156/580.2
[58] Field of Search ............... 156/580.1, 580.2, 73.1, 156/352, 353, 358, 361, 468, 495, 380.3, 380.4, 380.5, 380.9, 380.6, 274.4

[56] References Cited

U.S. PATENT DOCUMENTS

| | | | |
|---|---|---|---|
| 2,741,296 | 4/1956 | Collins | 154/42 |
| 3,232,810 | 2/1966 | Reesen | 156/380.3 X |
| 4,060,443 | 11/1977 | Balla | 219/10.81 X |
| 4,247,591 | 1/1981 | Gould | 428/212 |
| 4,265,687 | 5/1981 | Mercer et al. | 156/73.1 |
| 4,446,874 | 5/1984 | Vaguine | 219/10.55 F X |
| 4,496,819 | 1/1985 | Acker et al. | 219/10.73 X |
| 4,534,817 | 8/1985 | O'Sullivan | 156/580.1 X |
| 4,839,494 | 6/1989 | Vulpe | 156/380.9 X |

FOREIGN PATENT DOCUMENTS

| | | |
|---|---|---|
| 2149633 | 3/1973 | France . |
| 7304199 | 10/1973 | Netherlands . |
| 565592 | 11/1944 | United Kingdom . |

Primary Examiner—David A. Simmons
Assistant Examiner—J. Sells
Attorney, Agent, or Firm—Louis A. Morris

[57] ABSTRACT

An apparatus for fixing a tightly closed loop of a tape of thermoplastic material around an object, such as a bundle of cables. The apparatus includes two jaws which can be opened to encircle the object. The tape is fed around the inner periphery of the closed jaws. There are means for clamping the free end of the tape and pulling back the tape so as to draw it tight around the object. Welding members connected to a microwave generator, all incorporated into the apparatus, serve to effect a weld on the tape to form a closed loop around the object.

3 Claims, 12 Drawing Sheets

APPARATUS FOR MAKING A TIGHTLY CLOSED LOOP OF A TAPE OF THERMOPLASTIC MATERIAL AROUND AN OBJECT

BACKGROUND OF THE INVENTION

The invention relates to an apparatus similar to that described in U.S. Pat. No. 4,534,817.

In the portable apparatus of that reference the polymeric tape to be welded is clamped between two welding members, a backfoot and the tip of an ultrasonic transducer. The tip is vibratingly driven in longitudinal direction, so that a weld is formed by the frictional heat generated in the process. However, the energy that can be generated is limited, so that the use of this known apparatus has restrictions with regard to the thickness of the tape to be used and the type of tape.

Another ultrasonic bundle-tying apparatus having the same limitation is known from U.S. Pat. No. 4,265,687.

It should be noted that the welding together of components of thermoplastic material by the application of a high-frequency electric field to the desired welding area is known in itself, see e.g. U.S. Pat. No. 4,247,591, GB 565,592 and FR 2,149,633. In the latter patent specification the use of a frequency of 2450 MHz is disclosed. However, these publications do not refer to an apparatus of the type for making a tightly closed loop of a tape around an object.

SUMMARY OF THE INVENTION

The primary objective of the present invention is to obviate the drawbacks of the known apparatuses and, more particularly, to provide an apparatus of the type by which a very tightly strapped closed loop can be made in a rapid, certain, and reproducible manner, and which is able to employ microwaves for welding a thermoplastic strap into the closed loop.

Accordingly, the present invention comprises an apparatus for fixing a tightly closed loop of a tape of thermoplastic material around an object, comprising:

a. two jaws that can be moved relative to each other between an open and a closed, object-enclosing position, each having an inner tape guide channel along its inner periphery;

b. a first welding member comprising an electrode connected to a cavity resonator connected to a microwave generator with a frequency of at least 433 MHz;

c. a second welding member comprising a counter electrode connected to said cavity resonator positioned at a distance from said first welding member not greater than about three times the thickness of said tape, an electrical field intensity being generated between the first welding member and the second welding member by the microwave generator during operation of the apparatus;

d. means for the relative movement of the welding members to enable an open position when the tape is being positioned around the object, and a closed position when welding of the tape may be effected, said welding members being positioned with respect to said jaws so that the tape in the inner tape guide channel of said jaws will pass between the first and second welding members while the welding members are in the closed position;

e. means for passing the tape through the guide channel in the jaws in circumferential direction until its free end, after making at least one complete loop, is positioned between the welding members; and f. means for clamping the free end of the tape and for subsequently pulling back the tape, such that a tight loop is made around the object and there is formed between the welding members a welding point where at least two different sections of the tape overlap, said means for clamping the free end of the tape being separate from said first welding member and said second welding member and being positioned in advance of the welding point with respect to the direction in which the tape is fed.

Other embodiments of the present invention encompass details concerning the microwave generator, tape clamping means and preferred configurations of the apparatus.

DESCRIPTION OF THE PREFERRED EMBODIMENTS

In the apparatuses according to the prior art clamping of the free end of the tape during the pulling back of the tape is effected by the free end of the tape being clamped by the welding electrodes. Clearly, in that case only a limited force can be exerted on the tape as it is tightened, since the free end has to be prevented from escaping out from under the welding electrodes. Therefore, in the apparatus according to the invention, particularly in the preferred embodiments, the free end of the tape is tightly clamped by clamping means present especially for this purpose and considerable force can be exerted on the tape as it is pulled, so that a very tight loop can be made.

It is preferred that the microwave generator have a frequency of at least 800 MHz.

It is also preferred that the tape clamping means comprise a first clamp provided with a first gripping surface that can be pivoted about a pivot pin which is transverse to the tape feeding direction and a second clamp comprising two parts that can be moved relative to each other to an operating position and an open position and are each provided with gripping surfaces. These latter parts in cooperation with the first gripping surface clamp the tape between them in the operating position and allow it to be passed through in the open position. The first clamp is preferably provided with a passage for passing the tape and the two parts of the second clamp go on to form the second welding member. In the operating position the first clamp and the second clamp clamp the tape in the form of a V so as to enable the tape to be pressed against the object around which the loop of the tape is fixed at the point of the V.

There are preferred embodiments of the microwave apparatus used and the members acting in concert therewith. The cavity resonator may be composed of a coaxial cavity of which the outer conductor can be connected to the second welding member and the inner conductor comprises the first welding member. The cavity resonator may have a tubing member movable within it, such that when there is a coupling of the microwave energy in or near resonance between the first welding member and the second welding member an electrical field intensity sufficient for producing the weld is generated. The tuning member may consist of a tuning ring of dielectric material provided about the first welding member and movable lengthwise thereto.

There may be a control element that moves the tuning ring in a direction of increasing microwave intensity under the influence of the microwave intensity generated in the cavity resonator. In the feed line for feeding microwave energy to the cavity resonator there may be included a directional coupling via which part of the reflected microwave energy from the cavity resonator can be taken off. The directional coupling is connected to its control element which maximizes the microwave energy. A second coupling member may be provided in the cavity resonator. There is a rectifier with an input connection to the second coupling member and an output connection to the control element.

The cavity resonator may be tuned to a particular frequency and the frequency of the microwave generator may be varied over a range comprising the tuning frequency, such that, when the first welding member and the second welding member are in or near resonance, an electrical field intensity sufficient for producing the weld in the tape is generated. There may be a frequency tuning device for tuning the frequency of the microwave generator under the influence of the microwave intensity generated in the above cavity resonator to a value at which there is maximum microwave intensity. In the feed line for feeding microwave energy to the cavity resonator there may be included a directional coupling via which part of the reflected microwave energy from the cavity resonator can be taken off, and the directional coupling is connected to the frequency tuning device. A second coupling member may be provided in the cavity resonator as well as a rectifier with an input connection to the second coupling member and an output connection to the frequency tuning device. Near the welding point there may be positioned a melting wire to be heated by electric current being passed through it, for separating the formed loop after welding.

BRIEF DESCRIPTION OF THE DRAWINGS

The invention will be illustrated with reference to the drawings.

FIG. 1a-1e is a series of drawings illustrating the different stages of wrapping the tape around a bundle of cables, tightening it, and welding it;

FIG. 8a is a schematic illustration of a first embodiment of a tunable cavity resonator used according to the invention;

Fib. 8b shows the variation in tension between the welding electrodes as a function of the position of the tuning element present in the cavity resonator;

FIG. 10 is a view of a different construction of the embodiment according to FIG. 8a;

FIG. 11 is a view of a different construction of the embodiment according to FIG. 9a;

Shown in FIG. 15 is a partial cross-section of the front section of the apparatus.

DETAILED DESCRIPTION OF THE INVENTION

Figure 1A:
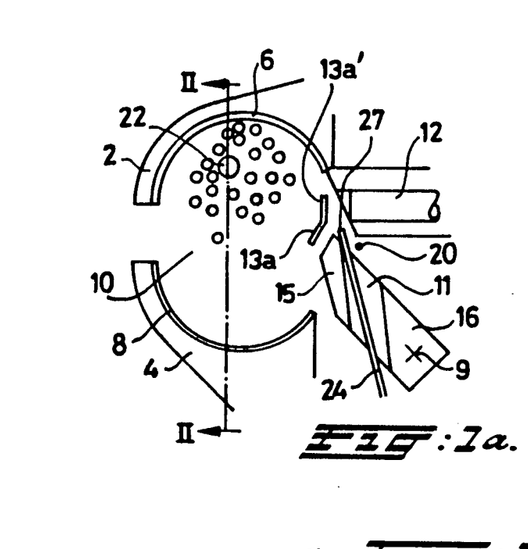
Figure 1B:
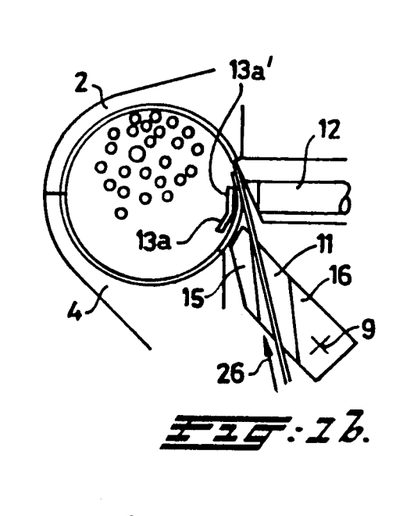
Figure 1C:
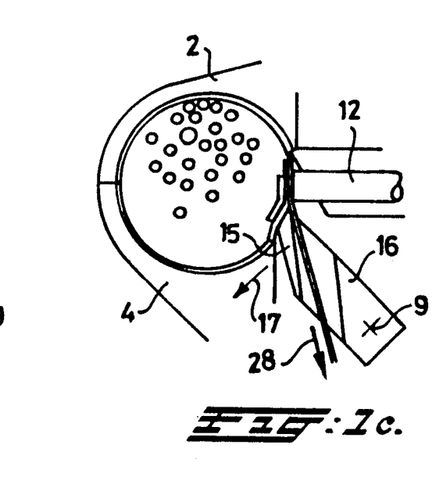
Figures 1D, 1E:
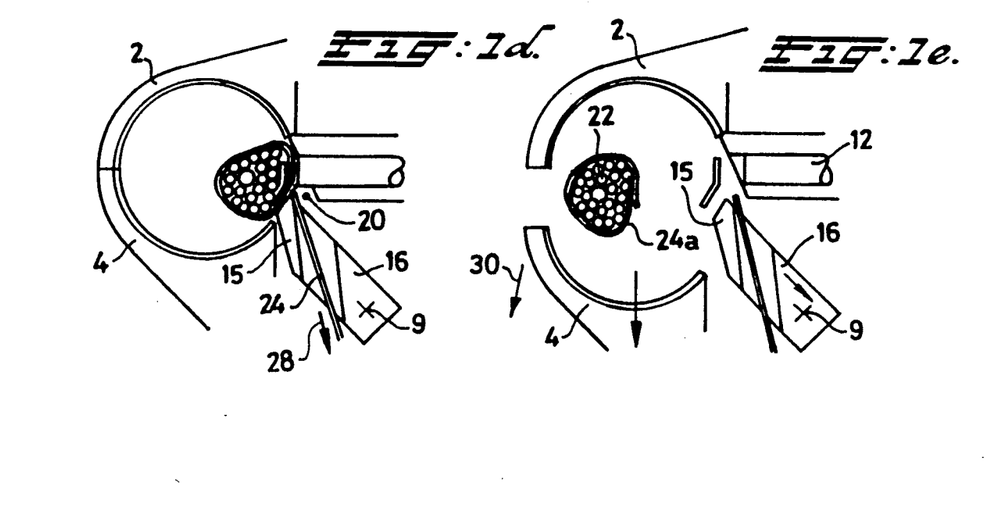
Figure 2:
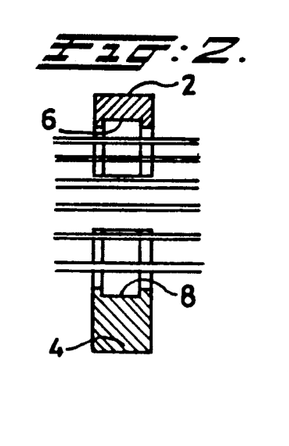
FIG. 2 is a cross-sectional view along the line II—II in FIG. 1.

Like the known apparatus the apparatus according to the invention shown in the drawing figures has a fixed jaw 2 and a movable jaw 4, in each of which has been provided a circumferentially arranged shallow tape guide channel, indicated with the numerals 6 and 8, respectively (see FIGS. 1 and 2). There is a first welding electrode 12 that can be moved to the space 10 enclosed by the jaws 2 and 4, and acting in concert therewith there are specially formed counter electrodes (13a', 13b'), the construction of which will be elucidated below with reference to FIGS. 3-7. In contradistinction to the prior art these electrodes are engaged in producing a seal not by supplying ultrasonic energy but by heating by microwaves and, equally in contradistinction to the prior art, none of the electrodes is used to clamp the sections of tape present between it as the tape is pulled back to make a tight loop.

The bundle of cables around which the tape has to be strapped in a tight loop is indicated with the numeral 22. The jaws, opened to their maximum width (see FIG. 1a), are placed around the bundle of cables 22 and then closed. This is the starting position. Subsequently, the cycle is started by actuating the appropriate controls (the situation according to FIG. 1b) and the tape 24 is fed in the direction of the arrow 26 by way of a suitable feeding mechanism.

Figure 3:
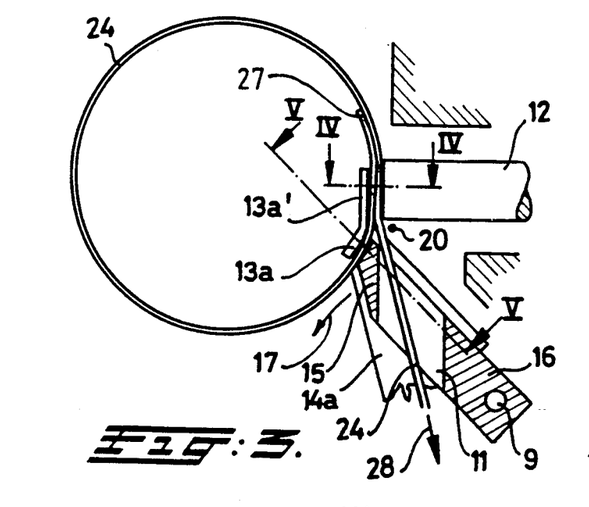
FIG. 3 shows the members used in making the loop and tightening the tape.
Figure 4:
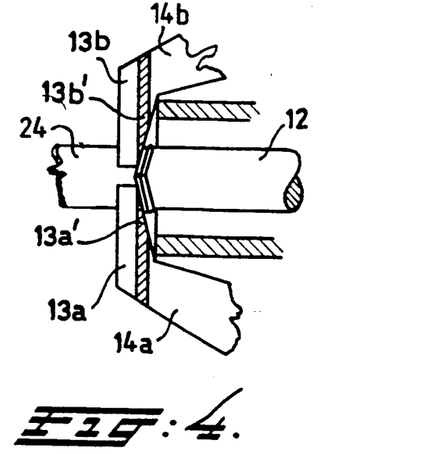
FIG. 4 is a cross-sectional view along the line IV—IV in FIG. 3.
Figures 5, 5A:
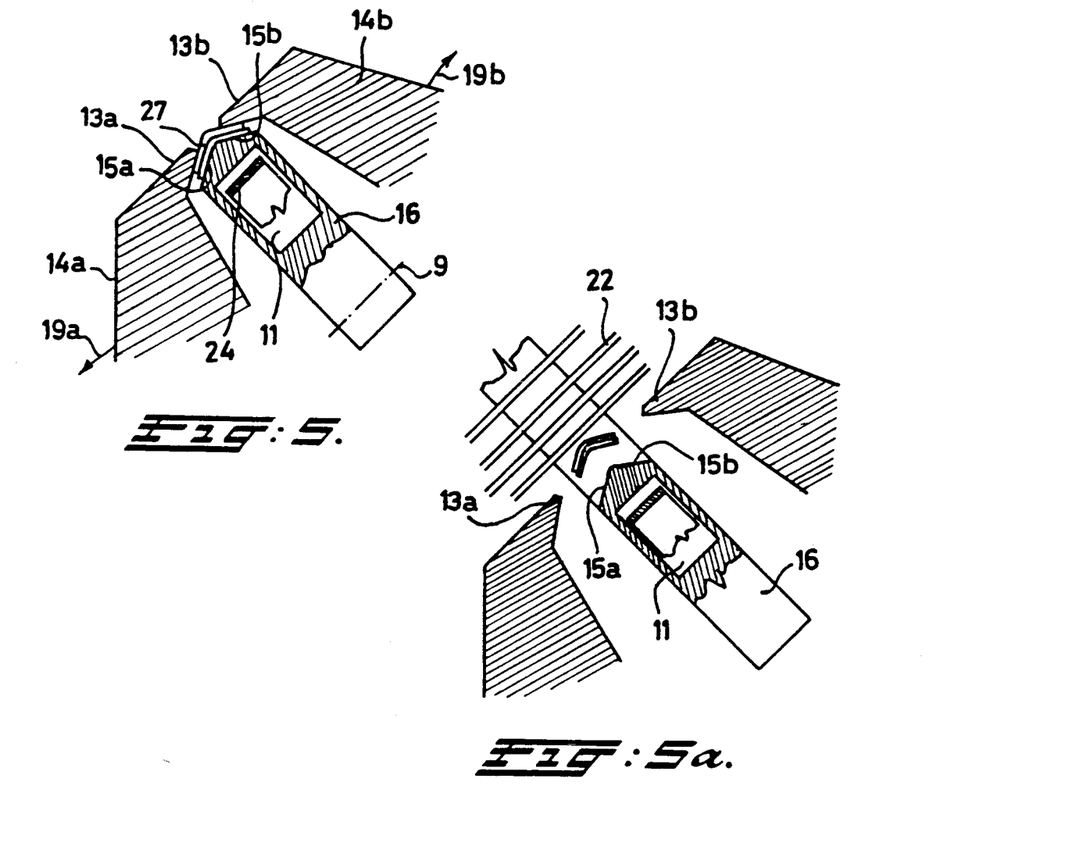
FIG. 5 is a cross-sectional view along the line V—V in FIG. 3.
FIG. 5a is a cross-sectional view corresponding to the one in FIG. 5, except that the tape clamping means 13a, 13b, and 16 are now in the open position.

As is illustrated in FIG. 1b, the tape 24 passes through the recess 11 in the pressure element 16, traverses the space between the electrode 12 and the tips 13a', 13b' serving as second electrode (see FIG. 7), its free end 27 (see FIG. 1a) being placed in the channel 6 in upper jaw 2; having travelled this channel, the tape is pushed through the channel 8 of the lower jaw 4 and finally the free end 27, having traversed the free space between the tips 13a, 13b and the surfaces 15a, 15b, is positioned in the space between the electrode 12 and the tips 13a', 13b' (see also FIGS. 3, 4, and 5). Since the total length of circumference of the channels 6 and 8 is known, the tape feeding mechanism may easily be so constructed that, having been activated, it will feed the proper length of tape and thus will stop when somewhat more than one complete loop has been made. The tape is now clamped just beneath the free end 27 between the tips 13a, 13b of the clamps 14a, 14b on the one hand and the surfaces 15a, 15b of the pressure element 16 on the other (see FIG. 5). Next, the tape drive mechanism is activated reciprocally by a suitable control, causing the tape to be pulled back in the direction of the arrow 28 (see FIGS. 1c and 1d).

Because the pressure element 16 can pivot about the shaft 9, the tip 15 of the pressure element 16 is moved somewhat at a tilt in the direction of the arrow 17 (see FIG. 1c) owing to the pull exerted on the tape 24 when it is pulled back in the direction of the arrow 28, as a result of which the tape 24 is very greatly tightened between the tip sections 13a, 13b on the one hand and the end surfaces 15a, 15b on the other (see also FIGS. 3, 4, and 5). For gripping enhancement the end surfaces 15a, 15b may be provided with serrations and/or a rough coating of, say, tungsten carbide chips. Because of this movement of the end 15 and hence of the pressure surfaces 15a, 15b the tape is rigidly clamped, while the part of the tape that is between the tip sections 13a', 13b' on the one hand and the end of the electrode 12 on the other still has sufficient space for moving: consequently, the tape can be tightened with a very high initial stress, so that, as is illustrated in FIG. 1d, a very tight loop is formed around the bundle of cables 22.

Next, also by means of a suitable drive and control the electrode 12 is moved by means of a spring in the direction of the tape 24 and between this electrode 12 and the tips 13a', 13b' there is created with a microwave generator a voltage of such a magnitude and frequency (say, 2.45 GHz) over such a period of time as to effect the welding together of the tape sections by microwave energy. The manner in which this is effected according to the invention will be disclosed hereinafter.

FIG. 1d illustrates the situation in which the welding has been completed. Then, with suitable switching, a cutting wire 20 positioned underneath the electrode 12 is energized (resistance heating) to melt off the tape very close (say, 0.2 mm) to the formed seal. The cutting wire 20 may take the form of a thread- or band-shaped resistance element. In the latter case the edge of the band may do the heat cutting. The microwave welding is not attended with any thickening and melting off directly below the seal prevents the formation of a projection that might create problems later, during the mounting of the bundle of cables. Finally, as is shown in FIG. 1e, the jaws 2 and 4 are again separated by the jaw 4 being moved downward in the direction of the arrow 30, so that they may be freed of the bundle of cables 22 now wrapped with the loop 24a, while the clamps 14a, 14b moving apart in the direction of the arrows 19a, 19b (see FIG. 5) free the apparatus of the now tightly strapped cable (see FIG. 5a).

The separate tape clamping means 13a, 13b, and 16 are shown in greater detail in FIGS. 3 through 5 and 5a. As the tape 24 is pulled back to produce a tight loop, it is clamped between the tips 13a and 13b, respectively, of the clamps 14a and 14b, respectively, and a pressure element 16 that can be tilted around the pivot 9. The clamps 14a and 14b and thus the tips 13a and 13b can swing aside laterally around the shaft 7 depicted schematically in FIGS. 6 and 7. The tightened, sealed tape is cut using an energized wire 20.

As is illustrated in particular in FIGS. 3 through 5, the pressure element 16 is constructed in a special manner; as was stated earlier, it can pivot about the shaft 9 and has a recess 11 for passing the tape indicated with the numeral 24. At the front 15 of pressure element 16 there are, tapering in an obtuse angle, the outer faces 15a, 15b, which act in concert with correspondingly formed inner faces of the tips 13a, 13b on the clamps 14a, 14b (see FIGS. 5 and 5a) for clamping between them the tape indicated with the numeral 24 just beneath the free end 27 of the tape. This tape is fed via the recess 11, as will be elucidated further.

Figure 6:
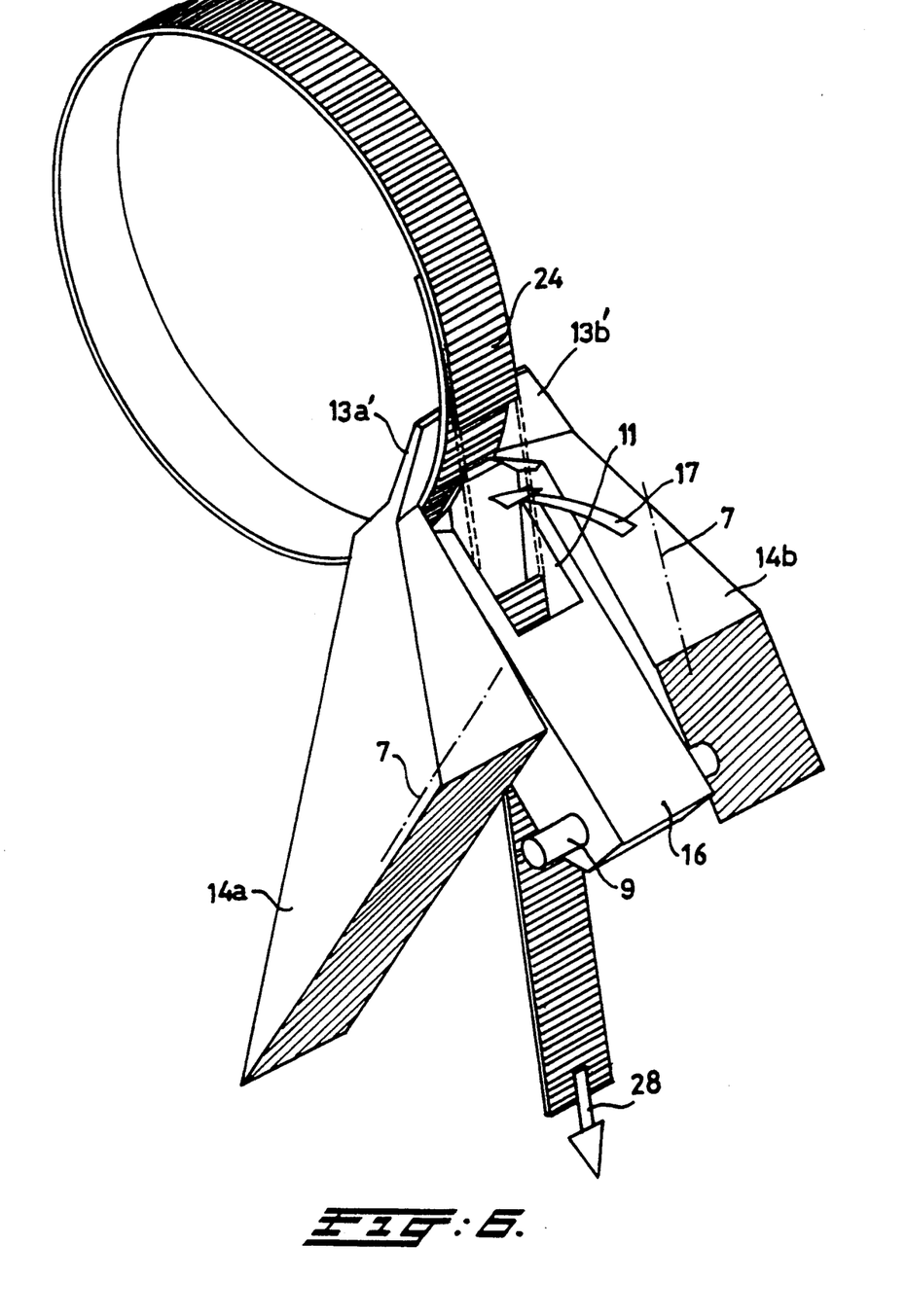
FIG. 6 is an enlarged perspective view of the tape clamping members.

The various sections illustrated in the figures discussed hereinbefore can also be seen in perspective in FIGS. 6 and 7; several of them will be discussed in greater detail with reference to FIGS. 12 and 13.

As is shown in FIGS. 3-7, in the position in which the clamps 14a, 14b are turned toward each other the tips 13a', 13b' forming the counter electrodes are a short distance apart, so that the tape is not heated and sealed across its entire width but a non-heated and hence unsealed section is left in the middle. This situation may best be seen in FIG. 4. The latter shows the clamps 14a, 14b in the closed position wherein the tape 24 is tightly gripped between the tip sections 13a, 13b of the clamps 14a, 14b on the one hand and the end surfaces 15a, 15b of the pressure element 16 on the other hand (see also FIG. 5). As will be further apparent from FIG. 4 the counter electrodes 13a' and 13b' allow the tape, while taking up a V form, to be pressed against the cable bundle via the interspace formed between these counter electrodes. This pressing is caused by the pulling force acting upon the tape as it is being tightened.

As a result, the tape can be kept quite tightly strapped during welding.

Clearly, welding the sections of tape together by using microwave energy constitutes an important aspect of the apparatus according to the invention and further details of this are provided with reference to FIGS. 8a, 8b, 9a, 9b, and 10, 11, and 12.

Figures 8A, 8B:
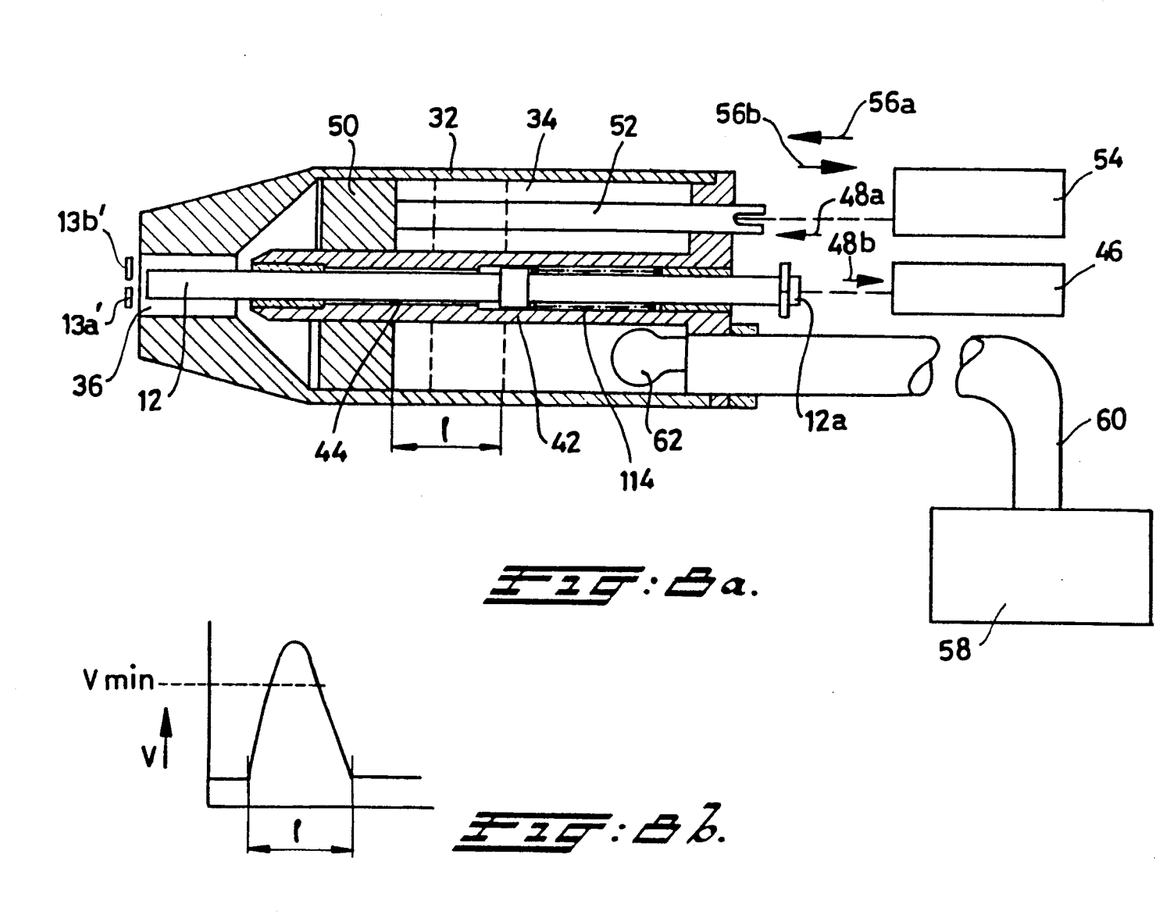

FIG. 8a illustrates the use according to the invention of a cylindrical, tapering microwave guide 32, which is in the form of a cavity resonator with the cylindrical cavity 34 and the tips 13a', 13b' of the clamps 14a, 14b. In the cavity 34 there is a cylindrical guide section 42 with a bore 44, into which is guided the longitudinally slidable central electrode 12. It is connected to the tip 12a projecting from wave guide 32 by means of a suitable drive mechanism indicated schematically with a rectangle 46. With this drive mechanism the electrode 12 can be reciprocated in the direction of the arrows 48a, 48b in such a manner that a spring 14 presses electrode 12 in the direction of the arrow 48a.

In the cavity 34 there is a tuning member 50 consisting of a disc of dielectric material connected to an operating rod 52, which, in its turn, is connected to a suitable drive 54, by means of which the rod 52 and hence the tuning member 50 can be reciprocated in the direction of the arrows 56a, 56b.

The microwave energy is supplied by a microwave generator 58, which provides a frequency of about 2.45 GHz and is connected to the waveguide 32 via a coaxial cable 60, using a suitable coupling element such as a coupling loop 62 connected to its inner and its outer conductor.

In the depicted position of the tuning member 50 the cavity resonator is not tuned to the frequency $F_o$ of the microwave signal supplied by the generator 58 and consequently, as shown in FIG. 8b, the tension V1 between the electrode 12 and the tips 13a', 13b' electric conductively connected to the waveguide 32 and serving as counter electrode will be too low to effect the production of a microwave energy-welded seal. However, the tuning member 50 can be moved to the right over the distance 1 to the position indicated with dash lines, and during this movement the point at which the cavity is in resonance is traversed, which is attended with a great increase in voltage between the electrode 12 and the tips 13a', 13b', viz. to above the level Vmin required for producing a seal by microwave energy. On continuing the movement to the right, the cavity resonator goes out of resonance again, and the voltage is reduced.

As has been said, FIG. 8b is an illustration of the voltage curve and it is clear that by having the movement take place at an appropriate speed and, optionally, stopping in the resonance point for a certain period of time, the period during which the voltage between the electrode 12 and the tips 13a', 13b' is sufficiently high for welding may be long enough to produce a satisfactory seal.

Figures 9A, 9B:
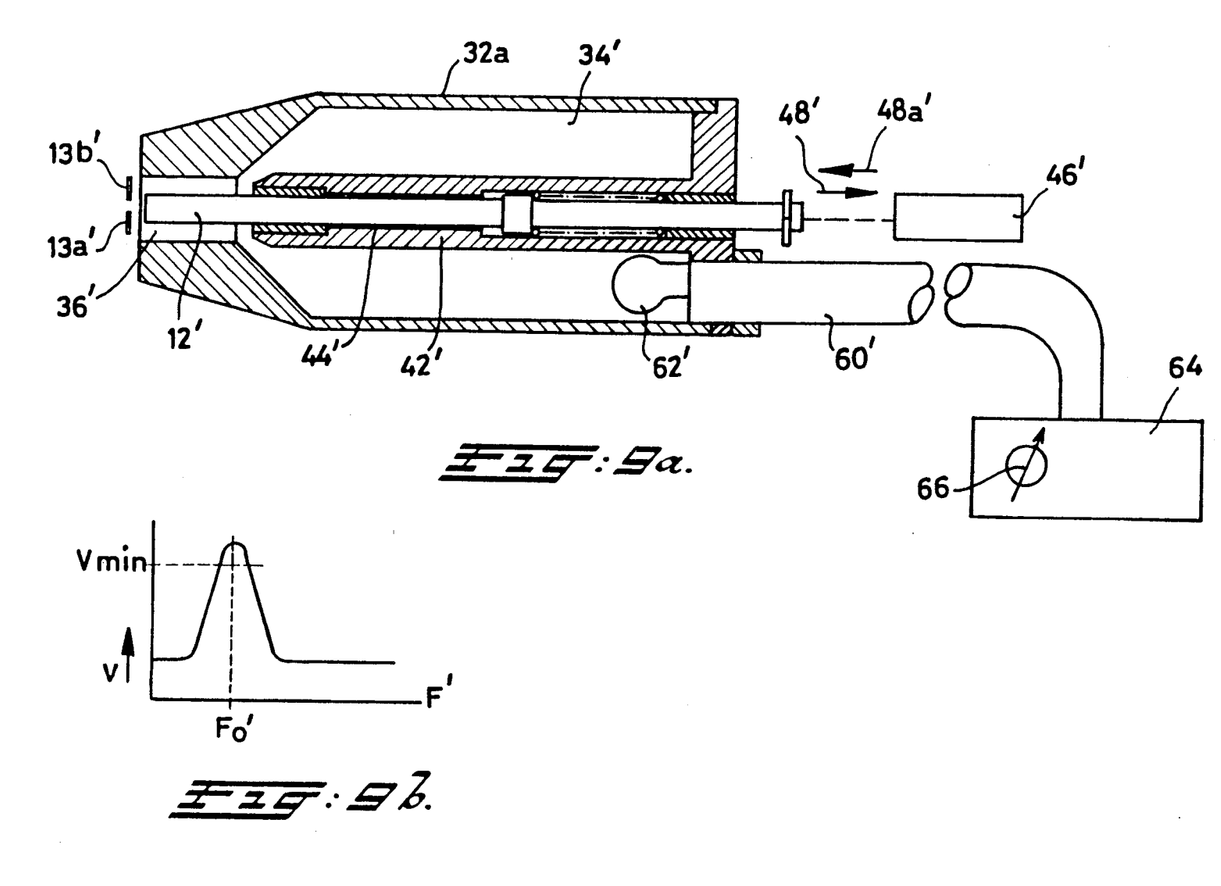
FIG. 9a is a schematic illustration of a second embodiment of the cavity resonator, to be supplied with a variable frequency.
FIG. 9b shows the curve of the tension between the welding electrodes as a function of the frequency.

The embodiment illustrated in FIGS. 8a and 8b has the advantage that a microwave generator operating at a fixed frequency may be employed, but requires the presence of a member to put the cavity resonator into and out of resonance. FIG. 9a refers to an embodiment in which the cavity resonator is tuned to a fixed frequency and the tension between the electrodes is controlled by varying the microwave generator's frequency. In FIG. 9a the elements corresponding to the embodiment according to FIG. 8a are indicated with the same numerals with an added apostrophe.

The energy introduced into the cavity resonator 34', which is not equipped with a tuning member, is supplied by a microwave generator 64, the frequency of which can be varied with the schematically depicted control element 66 about a central frequency $F_o'$, which may e.g. be 2.45 GHz. In FIG. 9b the frequency of the tension supplied by the generator 64 is plotted on the abscissa and the tension V between the electrode 12' and the tips 13a', 13b' on the ordinate, with the minimum tension required to bring about satisfactory sealing being indicated with the limiting value Vmin.

As is clear from FIG. 9b, the tension V will increase greatly and exceed the Vmin value when varying the frequency F' until it passes the resonance point of the cavity resonator; by having the frequency variation take place sufficiently slowly and, optionally, stopping temporarily, the period during which the tension V exceeds the Vmin value will be sufficiently long to ensure the production of a satisfactory seal.

In a full frequency sweep the frequency may start at some initial value below the resonance frequency $F_o'$, pass the resonance frequency $F_o'$ until it takes up a final value above the resonance value $F_o'$, then reduce so that it once again passes the resonance value $F_o'$ and finally return to its initial value. Instead of one single full frequency sweep it is possible to have two or more frequency sweeps per seal. Depending on the particular circumstances it is also conceivable that for each seal the frequency passes the resonance point only once.

In the case of the microwave heating illustrated with reference to FIGS. 8a and 8b it must be seen to that, by moving the tuning member 50, the cavity resonator 34 will be in and near resonance for some time during each welding cycle. The period in which this is the case must be of sufficient length to enable the generation of the heat needed for a seal. However, this period will constitute only a relatively small portion of the total amount of time needed to carry out a complete cycle of movement of the tuning member.

The effective time available for welding can be increased by not having the movement of the tuning member 50 take place in a "programmed" manner using a cam disc, but making it dependent on the cavity resonator 32 resonating or not. When, in that case, the tuning member 50 has reached a position in which there is resonance and hence optimum generation of heat, it may continue in that position for some time. The advantage of this arrangement lies in the fact that optimum generation of heat can be maintained for a desired period of time instead of its occurring only, as in the embodiment according to FIG. 8a, at the time when the tuning member 50 passes the position in which the cavity resonates.

Such an arrangement may be effected by having the movement of the tuning member 50 controlled by either
  the reflected signal from the cavity resonator, or
  the signal from a second coupling member provided in the cavity resonator in addition to the first one formed by the coupling loop 62.

Figure 10:
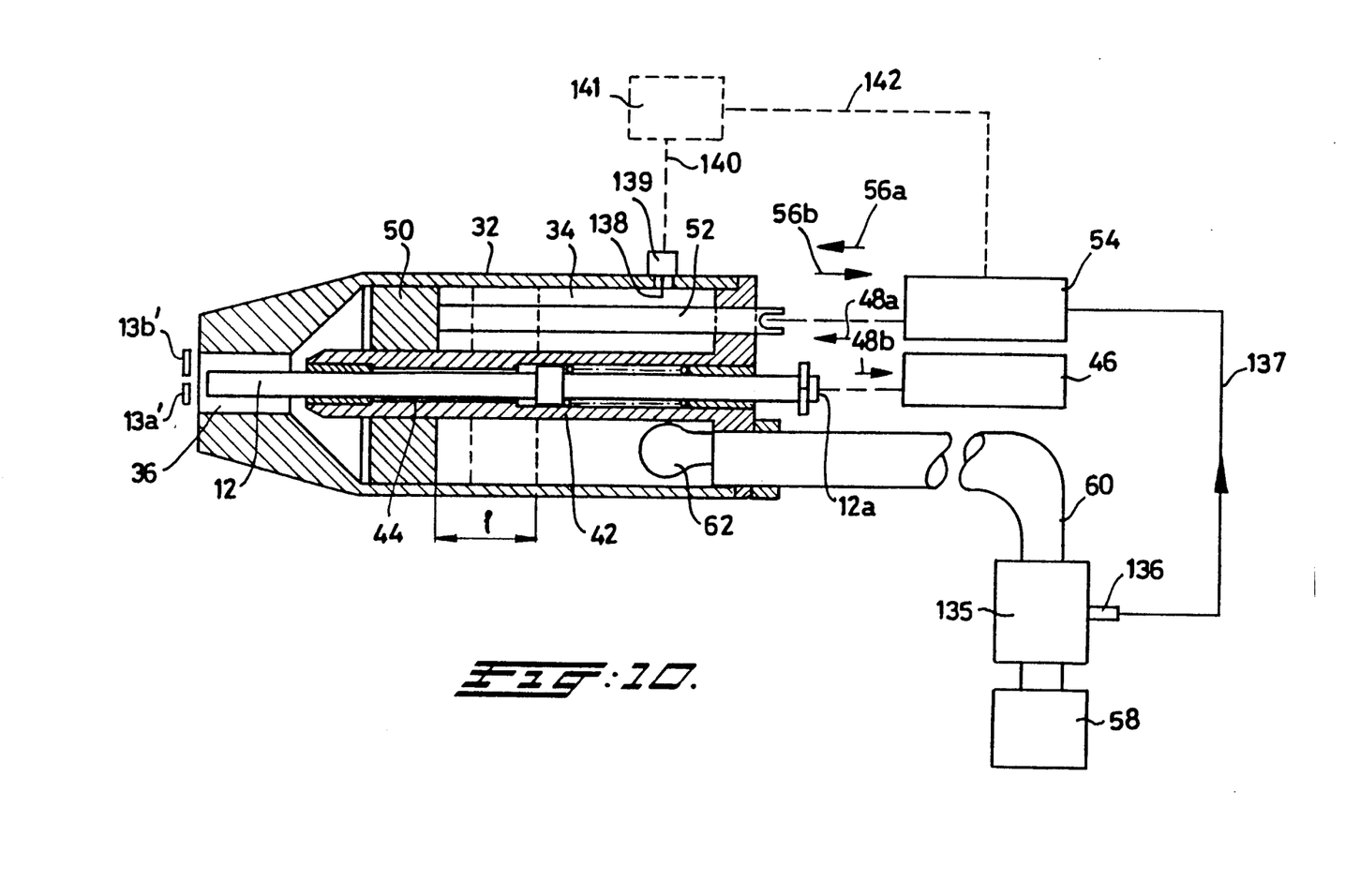

FIG. 10 is a schematic view of how this arrangement can be brought about when the movement of the tuning member is controlled by a signal from the cavity resonator 34. This figure corresponds for the most part to FIG. 8a, so that the same numerals refer to the same components. Included in the feed line 60 is a directional coupling 135 known in itself, via which part of the microwave energy reflected by the cavity resonator 34 can be taken off. This part may be picked off via the connector 136.

Via the schematically indicated connection 137 the signal is fed to the control device 54, which sees to maximizing the microwave energy picked off (using power or phase relations) by moving tuning member 50 by means of drive rod 52 into such a position as to cause the cavity 34 to resonate.

Also shown schematically in FIG. 10 is the alternative arrangement: a second coupling member in the form of a rod antenna 138 is provided in the cavity resonator 34. Via connector 139 and connecting line 140, optionally via rectifier 141, the antenna signal is supplied to the control device 54 via connection 142. Optionally, a rectifier may also be incorporated into line 137.

Figure 11:
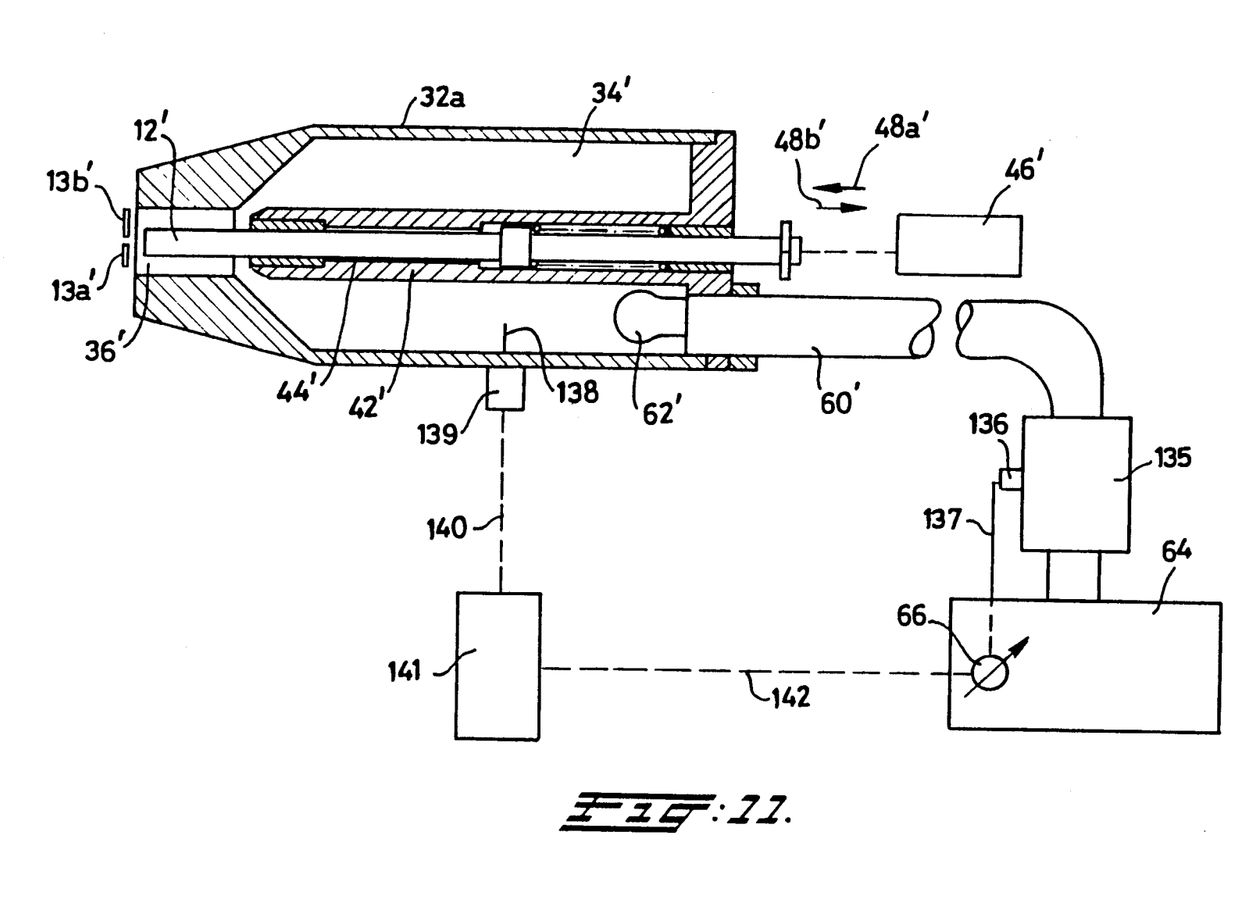

As FIG. 11 shows, in analogue manner the microwave generator 64 automatically may be so tuned as to bring cavity 34' into resonance. In a first embodiment there is incorporated into the feed line 60' directional coupling 135 via which part of the microwave energy reflected by the cavity resonator 34' is taken off to control the tuning of the microwave generator 64. This control is indicated schematically by connection 137 between the directional coupling 135 and control member 66 of the microwave generator 64.

Also shown schematically in FIG. 11 is an alternative manner of automatic frequency tuning: in the cavity resonator 34' there is provided a second coupling member 138 with which a signal is taken off which is supplied to rectifier 141 via connector 139 and connecting line 140. Via connection 142 rectifier 141 supplies the rectified signal to the control member 66, which sees to the automatic tuning of microwave generator 64. Connection 137 also may optionally include a rectifier.

Especially suited to be used for such automatic frequency tuning is a so-called solid state oscillator of, needless to say, sufficiently reliable construction.

Figure 12:
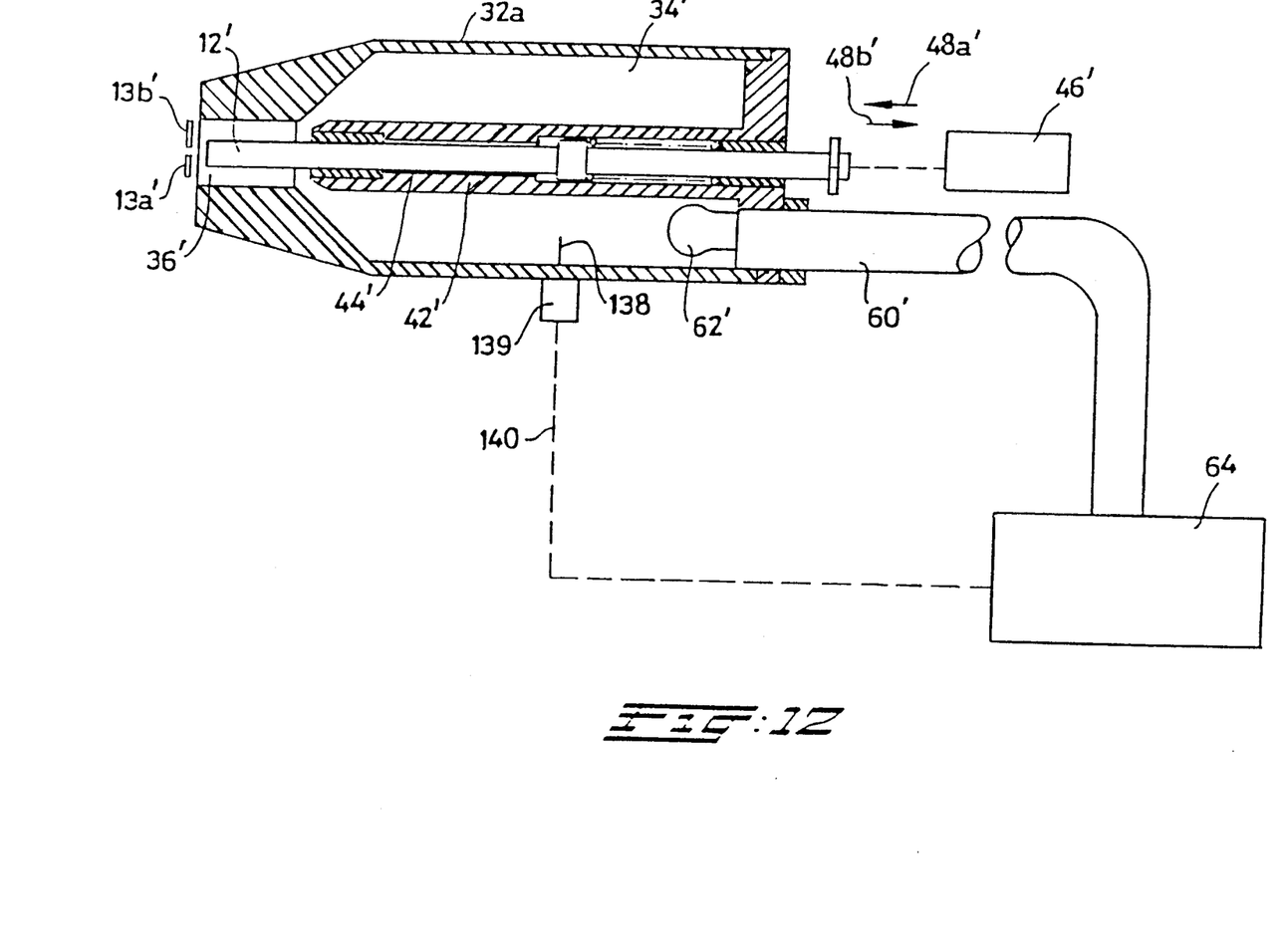
FIG. 12 shows yet another variant of the embodiment according to FIG. 9A.
Figure 13:
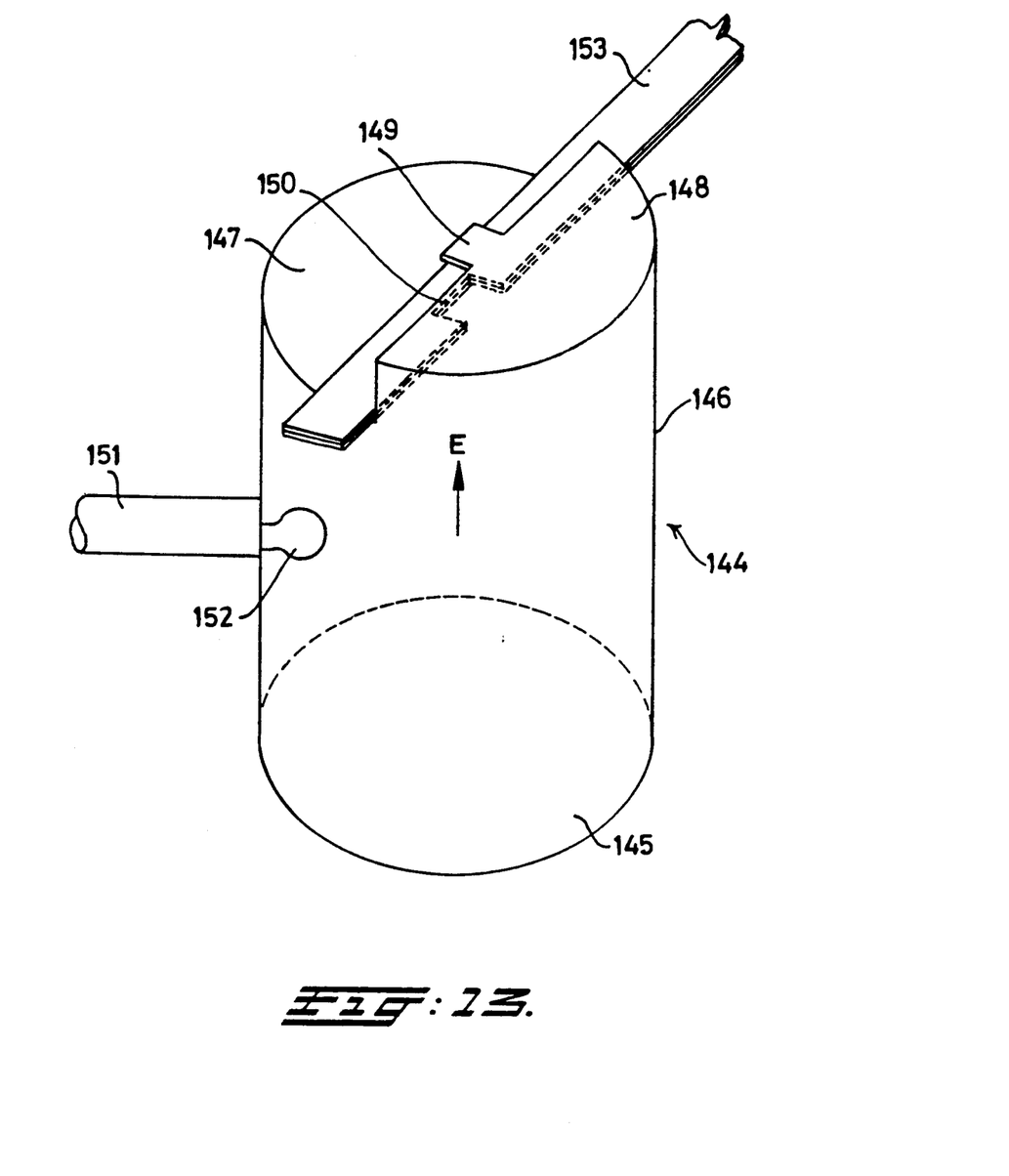
FIG. 13 is a view of a third construction of the cavity resonator.

FIG. 12 shows a still further variant of the embodiment according to FIG. 9a. In the embodiment of FIG. 12 a closed loop is formed by the microwave generator 64, the coupling loop 62', the cavity 34', the rod antenna 138, the connector 139 and the connecting line 140. Of this closed loop the cavity 34' is the frequency determining element. Due to the feedback of part of the microwave energy present in the cavity 34' to the microwave generator 64 by means of the antenna 138, the connector 139 and the connecting line 140 the tension supplied by the microwave generator 64 to the coupling loop 62' is automatically maximized (resonance condition).

The microwave generator may take the form of a magnetron, or of a low power oscillator with planar triode amplifier, or of a planar triode with the cavity (34') as the frequency determining element, or of a low power oscillator with solid state amplifier, or of a solid state amplifier with the cavity (34') as the frequency determining element.

Although in the above-described constructions use is made of a so-called coaxial cavity resonator with an inner and an outer electrode (12 and 32, respectively), it is also conceivable that a non-coaxial cavity resonator should be employed. Such a non-coaxial cavity resonator is depicted schematically in FIG. 13. In this figure the cavity resonator is indicated with the numeral 144. This cavity resonator is in the shape of a cylinder with a closed bottom face 145, a cylindrical wall 146, and a stepped top face composed of the semi-circular disc-shaped parts 147 and 148. Viewed in axial direction of the cavity 144 said parts are spaced slightly apart. The top part 148 has a tooth-shaped projection 149 which, viewed in axial direction, is positioned opposite to a recess 150 in the bottom part 147. Microwave energy is fed to the cavity resonator 144 via the coaxial cable 151 and the coupling loop 152 in analogous manner to that described for the constructions according to FIGS. 8 through 11. In the cavity resonator an electric field is formed, indicated schematically in FIG. 13 by the arrow E. This electric field will continue upward up to the tooth-shaped projection 149, which is comparable to the counter electrodes 13a' and 13b' in the constructions according to FIGS. 8 and 10 and 9 and 11, 12 respectively. By guiding the winding tape across the part 147, between the tooth-shaped projection 149 and the recess 150 situated opposite it, it may be sealed under the influence of the heat generated as a result of the strong electric field at the tooth-shaped projection 149.

The steps according to the invention may be carried out in a hand-held apparatus provided with a pistol grip. A schematic view of such an apparatus, indicated in its entirety with the numeral 70, is given in FIG. 14. It is composed of a housing 72, to which the fixed jaw 2 and the moveable jaw 4 are attached as well as the pistol grip 78 incorporating a bar-shaped electric motor 80. At the bottom the grip 78 supports the connector 82, which is connected to the tunable connecting loop in the cavity resonator via a coaxial cable (not shown) and by which feeding of the microwave energy takes place, and the connector 84 for feeding the supply voltage to the motor 80. The motor 80 is started by a trigger 86 controlling a switch 88; through a suitable transmission 90 the motor operates a series of tape guiding rollers and pulleys 92, around which the tape 102 has been guided in zigzag fashion, and which are therefore capable of exerting a strong pull on the tape. A second motor (not shown) operates a series of cam discs 94 controlling tilting levers, such as the tilting lever 96, that program the various members to be moved through follow-on rollers, such as the follow-on roller 98, and subsequently drive them. The operation of this second motor and of motor 80 is coordinated by means of microprocessor control (not shown).

Figure 14:
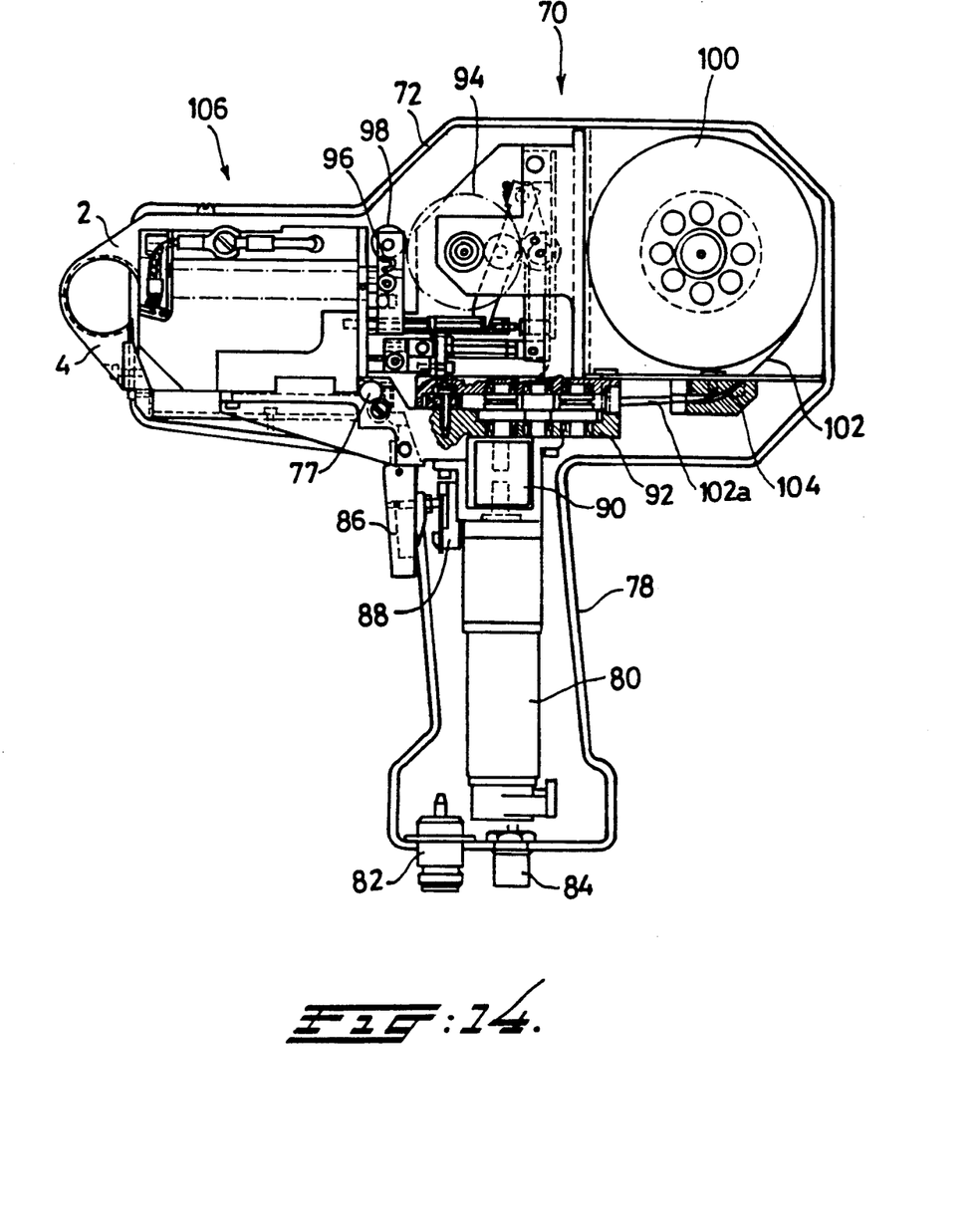
FIG. 14 is a schematic view, partly in section, of a complete apparatus.

There is a tape drum 100 from which the tape 102 is unwound; as the figure makes clear, initially, on leaving the drum 100, the tape 102 is perpendicular to the face of the drawing, but in the guiding section 104 it is so turned that the portion 102a is in the plane of the drawing, in which position it is guided around the rollers of the roller system 92. On leaving the roller system the tape is turned back through 90° again, so that the portion arriving at the jaws 2, 4 is again perpendicular to the plane of the drawing. According to a variant embodiment not shown in the drawings, the drive system for the tape (including the tape guiding rollers and pulleys) is turned through 90° with respect to the situation as shown in FIG. 9, thereby eliminating the need to turn the tape through 90° twice.

Figure 7:
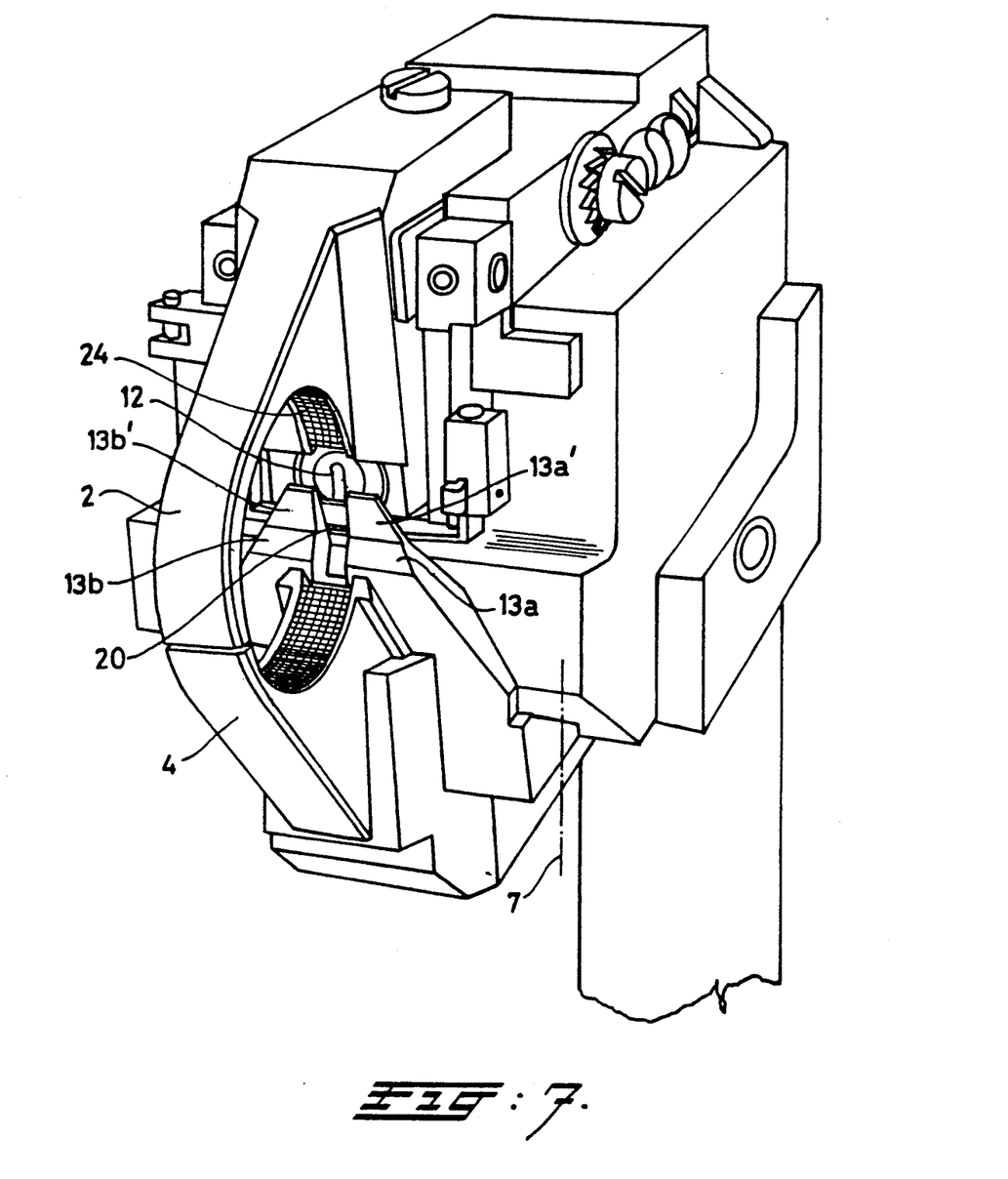
FIG. 7 is a perspective view of part of the tape guiding and clamping mechanism.
Figure 15:
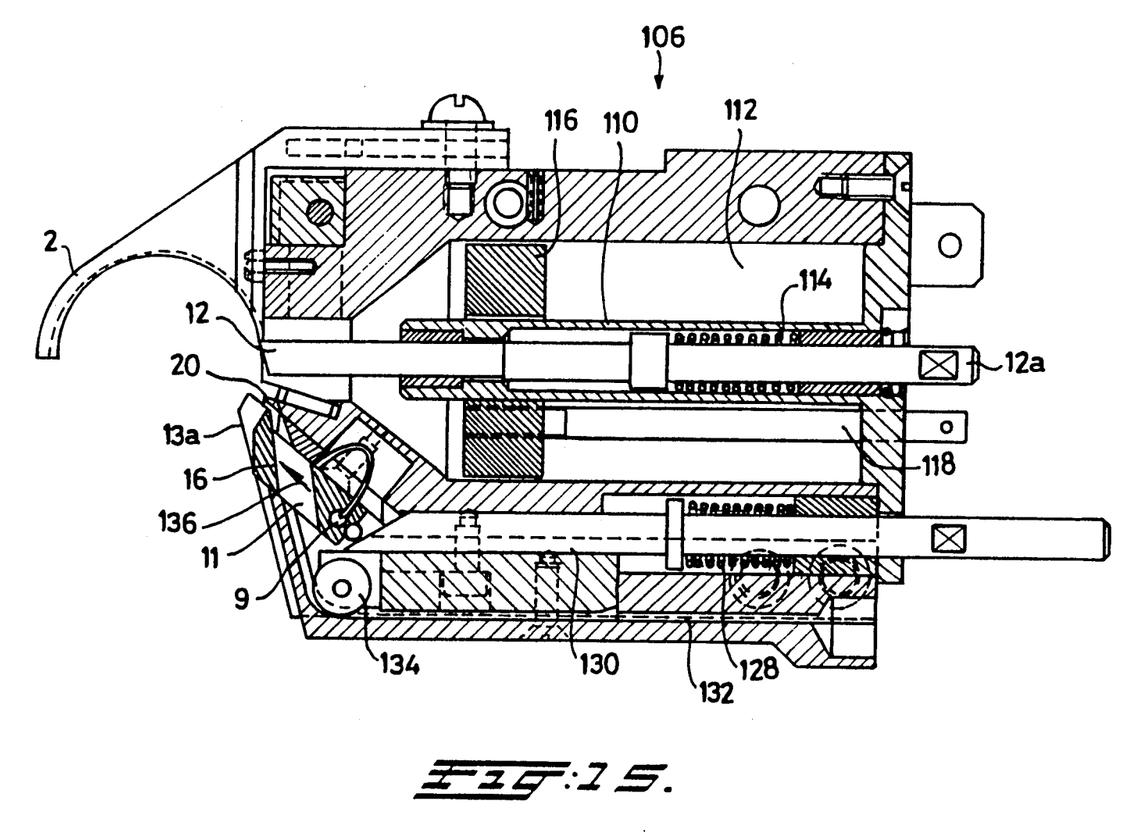

FIG. 15 gives a more detailed sectional view of the front end 106 of the apparatus, with the movable jaw 4—which can pivot about the shaft 77 (see FIG. 14)—not having been drawn for clarity; several of the members shown in FIG. 15 can also be seen in FIG. 7. The figure is a view of the electrode 12 and its cylindrical guide 110 positioned within the cavity resonator 112; the embodiment depicted operates in the manner of the embodiment depicted schematically in FIG. 8a, although it should be noted that the coupling loop for the supply of the microwave energy has not been drawn in FIG. 15.

The electrode 12 is counter slidable to the action of the spring 114 and its tip 12a is connected to the coupling link 96 indicated in FIG. 14 and driven by the cam follower 98 and one of the cams of the cam series 94. The cavity resonator contains the tuning member 116 controlled through the pressure rod 118 and also driven in a suitable manner from the cam series 94 (FIG. 14).

Also shown in the figure are the melt-off wire 20 and the pressure element 16 described hereinbefore which can pivot about the shaft 9 and is provided with the passage 11 for the tape: it is driven by the pressure rod 130 under the action of the spring 128 to carry out a sliding movement as indicated by arrow 136. The tape is fed via the tape guiding channel 132 and guided over the roller 134: the movement of the tape is as has been described hereinbefore. Finally, one of the clamps is indicated with the numeral 13a. Within the framework of the invention many changes can be made.

We claim:

1. An apparatus for fixing a tightly closed loop of a tape of thermoplastic material around an object, comprising:
   a. two jaws that can be moved relative to each other between an open and a closed, object-enclosing position, each having an inner tape guide channel along its inner periphery;
   b. a first welding member comprising an electrode connected to a cavity resonator connected to a microwave generator with a frequency of at least 433 MHz;
   c. a second welding member comprising a counter electrode connected to said cavity resonator positioned at a distance from said first welding member not greater than about three times the thickness of said tape, an electrical field intensity being generated between the first welding member and the second welding member by the microwave generator during operation of the apparatus;
   d. means for the relative movement of the welding members to enable an open position when the tape is being positioned around the object, and a closed position when welding of the tape may be effected, said welding members being positioned with respect to said jaws so that the tape in the inner tape guide channel of said jaws will pass between the first and second welding members while the welding members are in the closed position;

e. means for passing the tape through the guide channel in the jaws in circumferential direction until its free end, after making at least one complete loop, is positioned between the welding members; and f. means for clamping the free end of the tape and for subsequently pulling back the tape, such that a tight loop is made around the object and there is formed between the welding members a welding point where at least two different sections of the tape overlap, said means for clamping the free end of the tape being separate from said first welding member and said second welding member, being positioned in advance of the welding point with respect to the direction in which the tape is fed and comprising a first clamp provided with a first gripping surface that can be pivoted about a pivot pin which is transverse to the tape feeding direction and a second clamp comprising two parts that can be moved relative to each other to an operating position and an open position and are each provided with gripping surfaces, which parts in cooperation with the first gripping surface clamp the tape between them in the operating position and allow it to be passed through in the open position.

2. The apparatus of claim 1 wherein the first clamp is provided with a passage for passing the tape and the two parts of the second clamp go on to form the second welding member.

3. The apparatus of claim 2 wherein in the operating position the first clamp and the second clamp clamp the tape in the form of a V so as to enable the tape to be pressed against the object around which the loop of the tape is fixed at the point of the V.

* * * * *